United States Patent
Masui et al.

(10) Patent No.: US 6,348,170 B1
(45) Date of Patent: *Feb. 19, 2002

(54) PROCESS FOR PRODUCING A MULTILAYER MOLDED ARTICLE

(75) Inventors: Shohei Masui, Aichi; Masahito Matsumoto, Osaka; Nobuhiro Usui, Osaka; Toshihiro Hosokawa, Osaka; Ryuichi Ishitsubo, Osaka, all of (JP)

(73) Assignee: Sumitomo Chemical Company, Limited, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/173,930

(22) Filed: Dec. 28, 1993

Related U.S. Application Data

(63) Continuation of application No. 07/866,307, filed on Apr. 13, 1992, now abandoned, which is a continuation of application No. 07/455,009, filed on Dec. 22, 1989, now abandoned.

(30) Foreign Application Priority Data

Dec. 27, 1988 (JP) ............................................ 10-334089

(51) Int. Cl.⁷ ............................ B29C 45/14; B29C 70/70
(52) U.S. Cl. ........................ 264/266; 264/259; 264/275
(58) Field of Search ............................... 264/46.4, 46.6, 264/257, 259, 247, 266, 265, 263, 275, 271.1; 425/129.1, 121

(56) References Cited

U.S. PATENT DOCUMENTS

| | | | | |
|---|---|---|---|---|
| 2,509,499 A | * | 5/1950 | Higgins et al. | 264/134 |
| 2,847,712 A | * | 8/1958 | Pollard et al. | 264/259 |
| 3,074,112 A | * | 1/1963 | Bobrow | 264/275 |
| 3,148,233 A | * | 9/1964 | Gits | 264/247 |
| 3,549,477 A | * | 12/1970 | Burgman | 264/275 |
| 3,551,956 A | * | 1/1971 | Rosier | 264/275 |
| 4,491,556 A | * | 1/1985 | Fujii et al. | 425/129.1 |
| 4,873,041 A | * | 10/1989 | Masui | 264/266 |
| 5,053,179 A | * | 10/1991 | Masui et al. | 264/257 |

FOREIGN PATENT DOCUMENTS

| | | |
|---|---|---|
| EP | 0186015 | 7/1986 |
| EP | 8808364 | 11/1988 |
| EP | 0333198 | 9/1989 |
| GB | 2214860 | * 9/1989 |
| JP | 333198 A | * 9/1989 |

* cited by examiner

Primary Examiner—Angela Ortiz
(74) Attorney, Agent, or Firm—Birch, Stewart, Kolasch & Birch, LLP

(57) ABSTRACT

A multilayer molded article comprises a resin body and a skin material which covers a part of the surface of the resin body so that an edge part of the skin material present on the surface of the resin body is placed in a groove formed on the surface of the resin body. The article is produced by providing an unclosed mold comprising a lower mold having at least one pin for fixing the edge part of the skin material at a position where the edge part of the skin material is placed and an upper mold having a kick for forming the groove, placing the skin material on the lower mold and fixing the edge part of the skin material with the pin, supplying a mass of resin melt between the skin material and the lower mold, and closing the upper and lower molds to form the multilayer molded article.

8 Claims, 4 Drawing Sheets

PROCESS FOR PRODUCING A MULTILAYER MOLDED ARTICLE

This application is a continuation of application Ser. No. 07/866,307 filed on Apr. 13, 1992, which is a continuation of application Ser. No. 07/455,009 filed on Dec. 22, 1989, both now abandoned.

BACKGROUND OF THE INVENTION

1. Field of the Invention

The present invention relates to a process and a mold for producing a multilayer molded article comprising a resin body and at least one sheet of a skin material which covers a part of a surface area of the resin body.

2. Description of the Related Art

A multilayer molded article comprising a resin body and a skin material laminated on the resin body has good appearance due to its high quality and warm feeling. The multilayer molded article greatly improves the textures of a resin molded article, such as providing for a cool feeling and provides an article with high value and beauty.

In fact, the multilayer molded articles are widely used as automobile interior materials or furnishing materials.

To improve the ornamental effect of the skin of a multilayer molded article, it is desired to laminate the skin material on a part of the surface of the resin body. However, the conventional processes or molds for producing the multilayer molded article cannot produce such an improved multilayer molded article. The free edge of the skin material covering a part of the surface of the resin body cannot be beautifully finished.

SUMMARY OF THE INVENTION

One object of the present invention is to provide a process for producing a multilayer molded article comprising a resin body and a skin material which covers a part of the surface of the resin body.

Another object of the present invention is to provide a mold suitable for producing a multilayer molded article comprising a resin body and a skin material which covers a part of the surface of the resin body.

According to a first aspect of the present invention, there is provided a process for producing a multilayer molded article comprising a resin body and a skin material which covers a part of the surface of the resin body so that an edge part of the skin material present on the surface of the resin body is placed in a groove formed on the surface of the resin body, which process comprising steps of:

providing an unclosed mold comprising a lower mold having at least one pin for fixing the edge part of the skin material at a position where the edge part of the skin material is placed and an upper mold having a kick for forming the groove, placing the skin material on the lower mold and fixing the edge part of the skin material with the pin, supplying a mass of resin melt between the skin material and the lower mold, and closing the upper and lower molds to form the multilayer molded article.

According to a second aspect of the present invention, there is provided a mold for producing a multilayer molded article comprising a resin body and a skin material which covers a part of the surface of the resin body so that an edge part of the skin material present on the surface of the resin body is placed in a groove formed on the surface of the resin body, which mold comprises a lower mold having at least one pin for fixing the edge part of the skin material at a position where the edge part of the skin material is placed and an upper mold having a kick for forming the groove on the surface of the resin body.

DETAILED DESCRIPTION OF THE DRAWINGS

In the present invention, the skin material may be any of conventionally-used materials. Specific examples of the skin material are woven or non-woven fabric, nets made of metals, fibers or thermoplastic resins, paper, metal foils, and a sheet or a film of a thermoplastic resin or elastomer. The skin material may be decorated with uneven patterns such as grain patterns, printing, dying and the like. In addition, the skin material may be made of foamed materials of thermoplastic resins or rubbers. Also, a laminate comprising at least two layers each made of the same material or different materials which are bonded to each other with an adhesive can be used as the skin material. Before the skin material is supplied in the mold, a part or whole of the skin material may be preheated to adjust tensile stress and elongation.

As the resin to be molded by the process of the present invention, any of the conventional resins used in compression molding, injection molding and extrusion molding can be used. Specific examples of the resin are non-expandable or expandable resins of thermoplastic resins (e.g. polypropylene, polyethylene, polystyrene, acrylonitrile-styrene-butadiene copolymer, nylon, etc.), and thermoplastic elastomers (e.g. ethylene-propylene copolymer, styrene-buta-diene copolymer, etc.). The resin may contain at least one additive such as fillers (e.g. inorganic fillers and glass fibers), pigments, lubricants, antistatic agents and the like.

Figure 1:
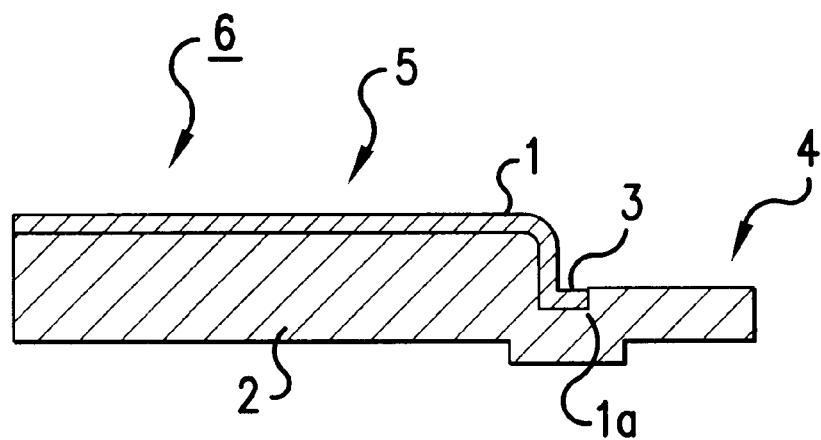
FIG. 1 is a cross section of the multilayer molded article having the skin material which covers a part of the surface of the resin body.
Figure 2:
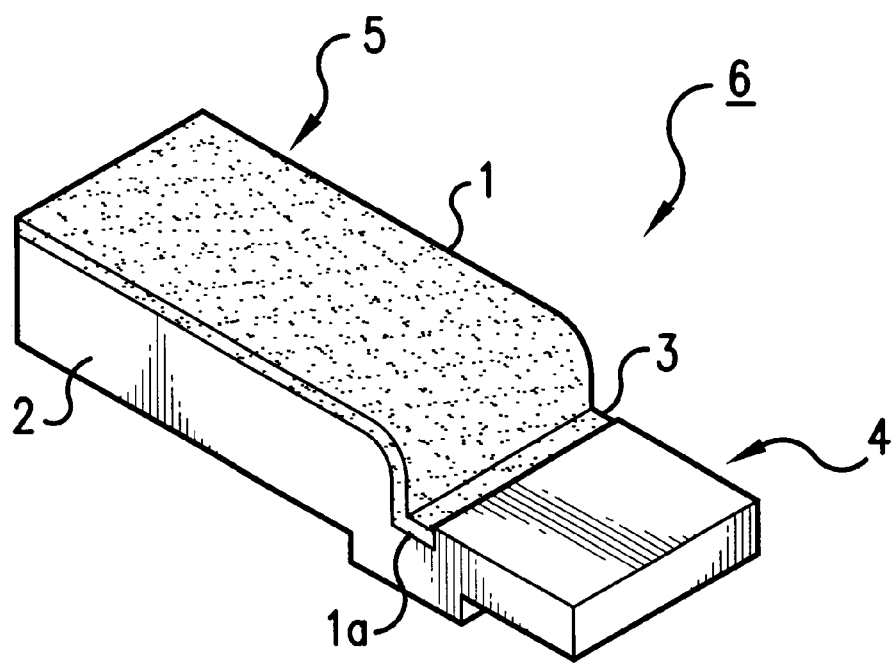
FIG. 2 is a perspective view of the multilayer molded article of FIG. 1, FIGS. 3 and 4 schematically show the process for producing the multilayer molded article according to the present invention with FIG. 3 being a cross section of the mold of FIG. 5B along the line A—A at the start of molding and FIG. 4 having a cross section of the mold of FIG. 5B along with the line A—A at the end of molding.

FIGS. 1 and 2 show a cross section and a perspective view, respectively, of the multilayer molded article 6 produced in one embodiment of the present invention, which has a skin material 1 covering a part 5 of a surface of a resin body 2 with leaving a surface area 4 uncovered. An edge part 1a is placed in a groove 3 which is formed on the surface of the resin body 2.

The groove 3 has a width and a depth sufficient for receiving the edge part 1a of the skin material 1, and the sizes of the groove 3 depend on the type of material, and a thickness and the width of the edge part of the skin material.

Figure 3:
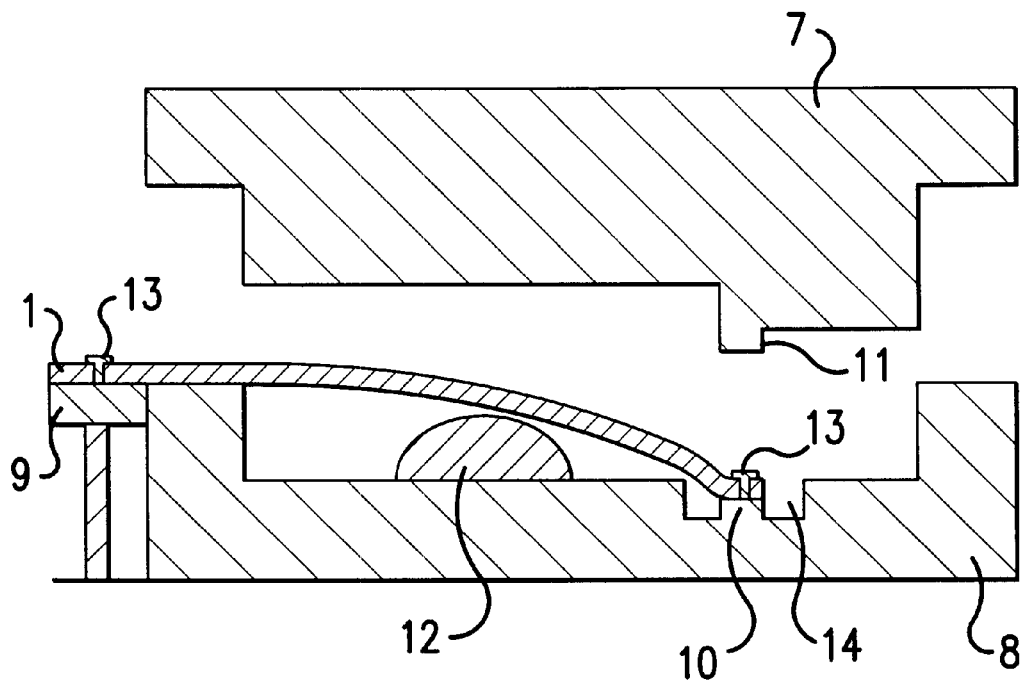

One example of the mold to be used in the process according to the present invention is shown in FIG. 3.

The mold comprises an upper mold 7 and a lower mold 8. The lower mold 8 has means for fixing the edge part 1a of the skin material 1. In one embodiment, one or more pins are retained on one or more discretely formed protrusions as shown in FIG. 3.

The number of pins depends on the length of the edge part 1a to be fixed. Further, the protrusions and the pins may be movable in a direction in which the molds are closed, although they may be fixed to the lower mold 8.

Figure 4:
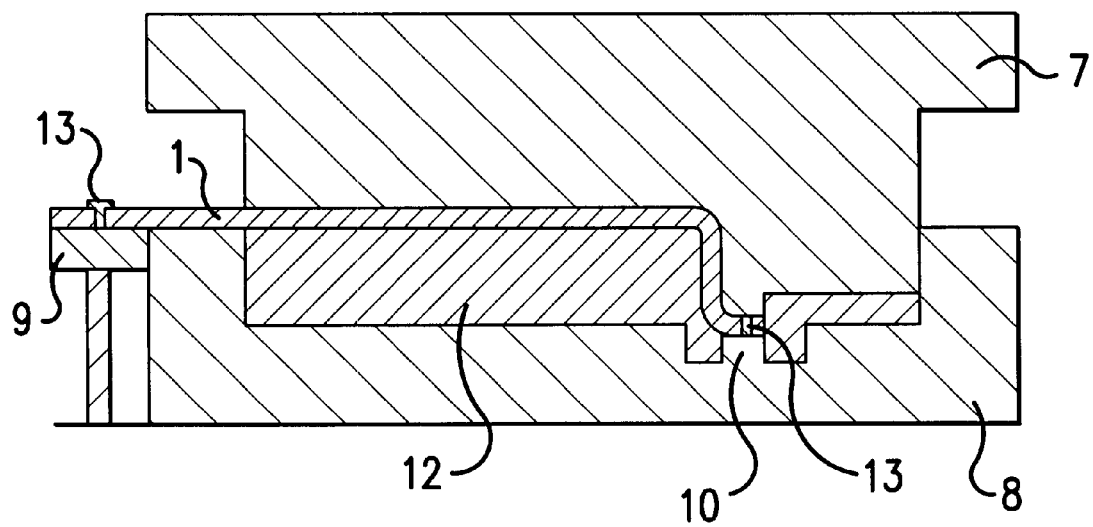

The article produced by using the mold of FIG. 4 has small holes corresponding to the protrusions 10. If the protrusions are lowered by, for example, hydraulic action after the resin melt is filled in the cavity of the mold and before the resin melt is solidified, such holes disappear and only the pin holes remain in the article.

When the pin is vertically movable, it is lifted up to a level at which the edge portion 1a is easily fixed with the pin 13, and it is lowered to a desired level during molding.

The upper mold 7 has a kick 11 at a position which the edge part 1a contacts. The kick may be movable in a direction in which the molds are closed.

Edge parts other than the edge part 1a can be fixed with a clamping frame 9 surrounding the mold.

The multilayer molded article can be produced by using the mold of FIG. 3 as follows:

The edge part 1a of the skin material 1 is fixed to the fixing section 10 with the pin 13. Then, other edge is fixed to the clamping frame with other pin 13.

Figure 5A:
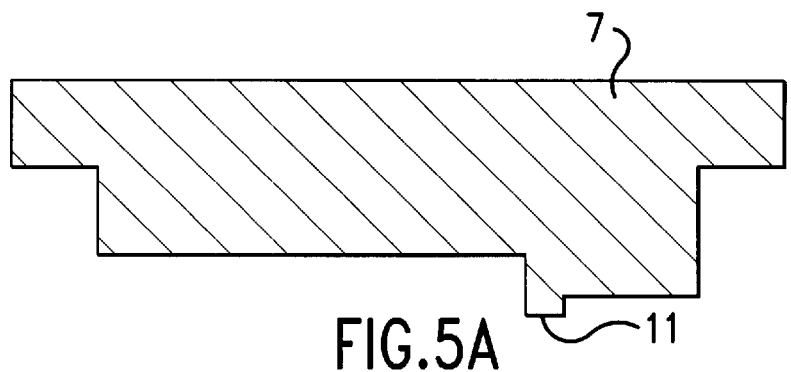
FIGS. 5A, 5B and 5C are a cross section of the upper mold, a plane view of the lower mold and a cross section of the lower mold, respectively, of a first embodiment of the mold of the present invention.
Figure 5B:
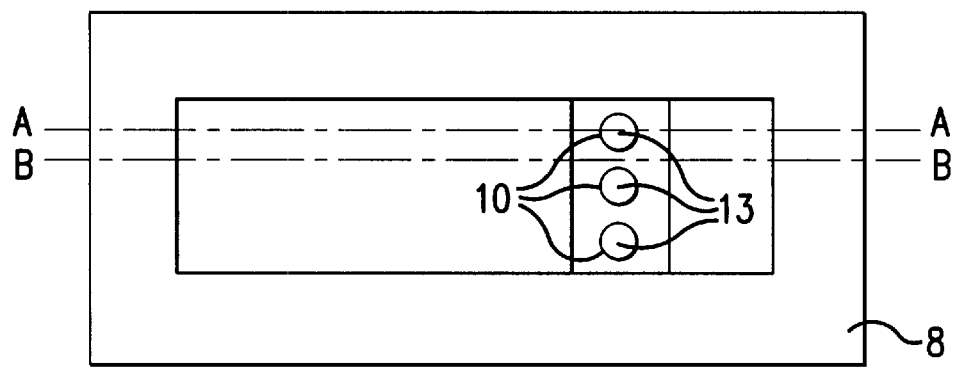
Figure 5C:
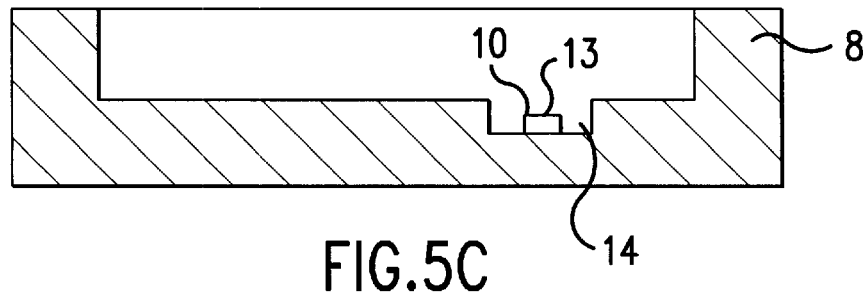

A mass of resin melt 12 is supplied between the skin material 1 and the lower mold 8. Since the edge part 1a is fixed with the pin to the fixing section 10, there are free gaps between the protrusions as shown in FIG. 5B, so that the resin melt can flow through such gaps and spread all over the inner surface of the lower mold 8 when the molds 7 and 8 are closed and the resin melt is compressed.

Figure 6:
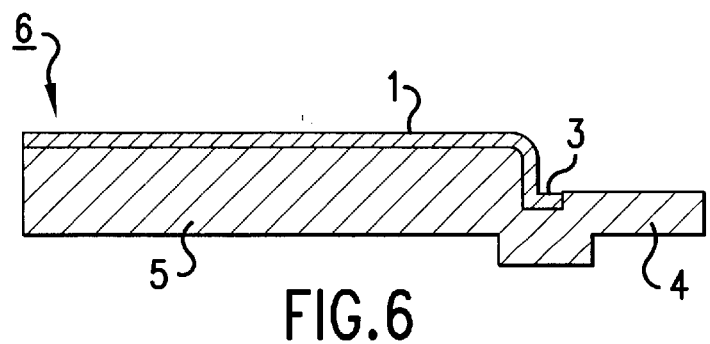
FIG. 6 is a cross section along the line corresponding to line B—B at FIG. 5B of the multilayer molded article produced by means of the mold shown in FIGS. 5A, 5B and 5C, FIGS. 7A, 7B and 7C are a cross section of the upper mold, a plane view of the lower mold and a cross section of the lower mold, respectively, of a second embodiment of the mold of the present invention.

By the above process, the multilayer molded article 6 shown in FIG. 6 is produced.

Figure 7A:
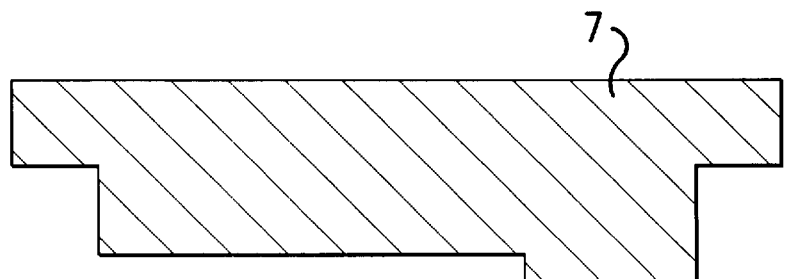
Figure 7B:
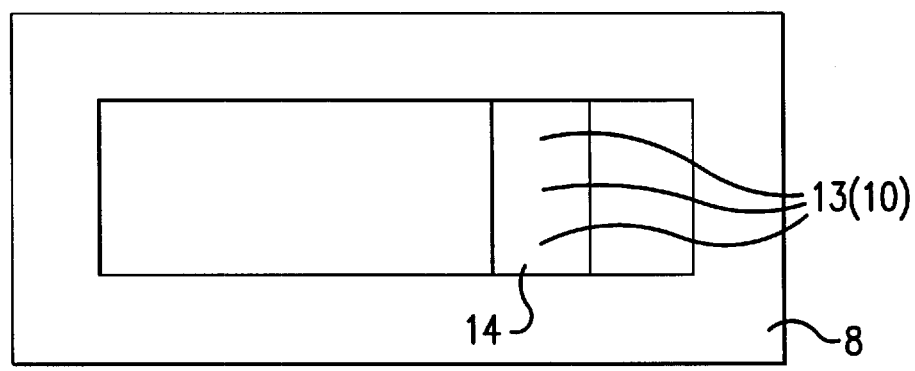
Figure 7C:
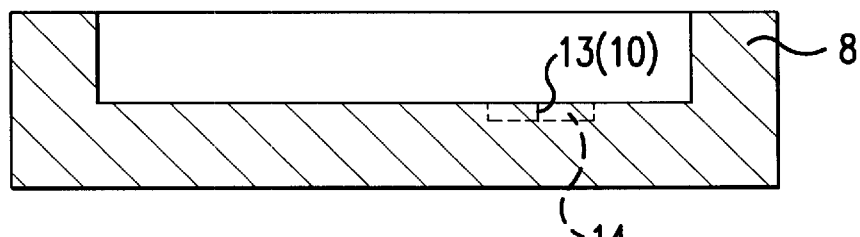

In the embodiment of FIGS. 7A, 7B and 7C, the pins 13 are directly attached to the bottom of groove 14. Then, the edge part 1a of the skin material is fixed at the upper part of each pin 13, so that a gap is formed between the skin material and the groove bottom.

Figure 8:
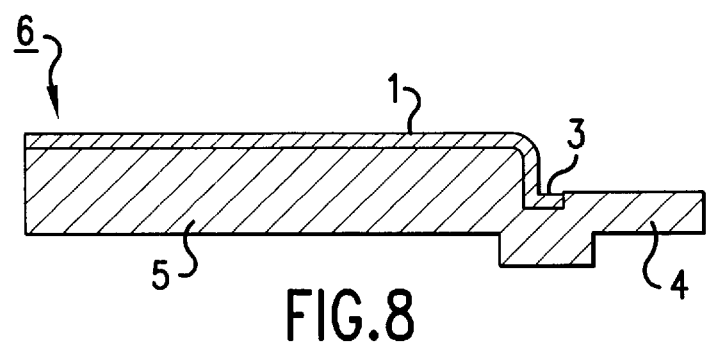
FIG. 8 is a cross section of the multilayer molded article produced by means of the mold shown in FIGS. 7A, 7B and 7C.

With using such a mold, the multilayer molded article 6 shown in FIG. 8 can be produced by substantially the same procedures as described above. The kick 11 forms a groove which receives the edge of the skin material to beautifully finish the edge of the skin material.

In the multilayer molded article produced by the process of the present invention, the boundary is clearly formed between the covered surface area 5 and the uncovered surface area 4.

What is claimed is:

1. A molding process for producing a multilayer molded article comprising a thermoplastic resin body so that an edge part of the skin material present on the surface of the thermoplastic resin body is placed in a groove formed on the surface of the thermoplastic resin body, which comprises the steps of:

providing an unclosed mold which includes a lower mold having at least one pin retained on a protrusion on an inner surface of the lower mold for fixing the edge part of the skin material at a position where the edge part of the skin material is placed, and further includes an upper mold having a kick for forming the groove, wherein the protrusion is formed on the groove which is formed in the lower mold, placing the skin material on the lower mold and fixing the edge part of the skin material with at least one pin on the inner surface of the lower mold, such that it does not shift during molding, supplying a mass of resin melt between the skin material and the lower mold so that the mass of resin melt flows through gaps around the at least one pin and is spread over the inner surface of the lower mold, and closing the upper and lower molds so that said edge part of the skin material which is fixed by the at least one pin is placed in said groove formed on the surface of the thermoplastic resin body to thereby form the multilayer molded article having one part covered by the skin material and another part free of the coverage by the skin material.

2. The process according to claim 1, wherein the protrusion is movable in a direction in which the upper and lower molds are closed.

3. The process according to claim 1, wherein the protrusion is movable in a direction in which the upper and lower molds are closed.

4. The process according to claim 1, wherein the skin material is a member selected from the group consisting of woven fabric, non-woven fabric, metal net, fibers, paper, metal foil, thermoplastic resin-film and foamed thermoplastic resin.

5. The process according to claim 1, wherein the skin material comprises a laminate of at least two layers bonded together with an adhesive and formed from one or more of the materials selected from the group consisting of woven fabric, non-woven fabric, metal net, fibers, paper, metal foil, thermoplastic resin sheet, thermoplastic resin film and foamed thermoplastic resin.

6. The process according to claim 1, wherein the skin material is preheated to adjust tensile stress and elongation before the skin material is placed in the mold.

7. The process according to claim 1, wherein the resin melt is selected from the group consisting of polypropylene, polyethylene, polystyrene, acrylonitrile-styrene-butadiene copolymer, nylon, ethylene-propylene copolymer and styrene-butadiene copolymer.

8. The process according to claim 1, wherein the resin melt contains at least one additive selected from the group consisting of inorganic fillers, glass fibers, pigments, lubricants and antistatic agents.

* * * * *